J. L. CREVELING.
ELECTRIC REGULATION.
APPLICATION FILED FEB. 16, 1912. RENEWED JULY 6, 1918.
1,293,720.
Patented Feb. 11, 1919.
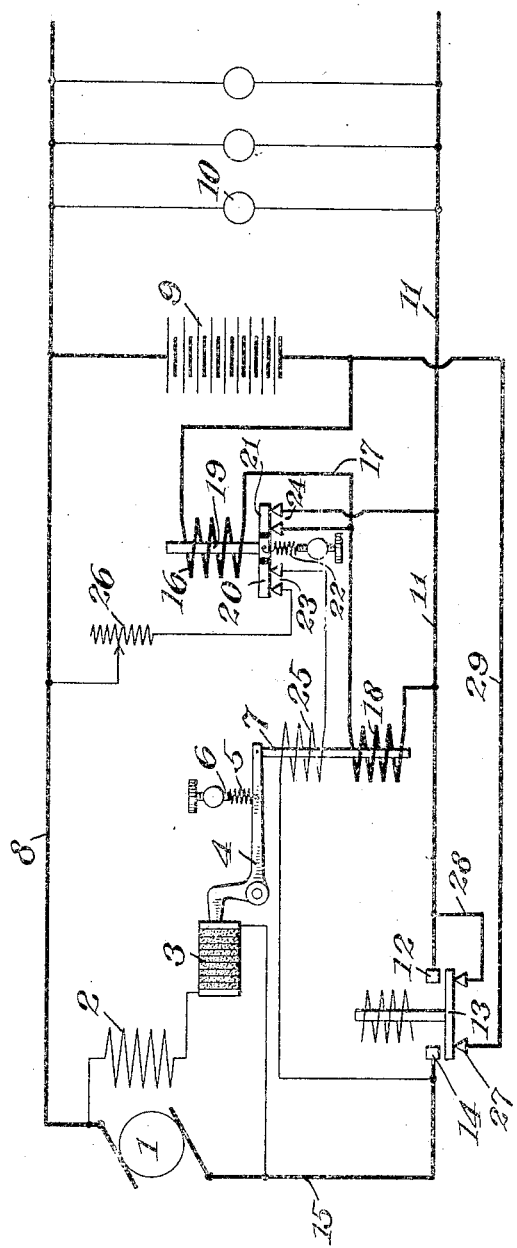

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,293,720.  Specification of Letters Patent.  Patented Feb. 11, 1919.

Application filed February 16, 1912, Serial No. 678,073. Renewed July 6, 1918. Serial No. 243,703.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to automatically regulate a dynamo or generator in a predetermined manner.

As my invention is particularly applicable to systems of electric distribution wherein a generator driven at variable speeds is used to charge a storage battery and operate lamps or other translating devices, it will be described with reference to such a system.

The drawing is a diagrammatic representation of one type of system embodying the essentials of my invention.

In the drawing, 1 represents a dynamo or generator provided with the usual field coil 2 having in series therewith a regulating element 3, in this instance shown as a carbon pile resistance. 4 is a lever normally drawn in an upward direction as by the spring 5, adjustable as by the screw 6, the said spring 5 tending to compress the carbons 3 and lower the resistance thereof. 7 is a core of magnetic material carried by the lever 4, and thus it will be obvious that motion imparted to the said core may regulate the generator. 8 is the positive lead of the generator and is carried to the positive side of the storage battery 9 and lamps or other translating devices indicated at 10. The negative terminals of the translating devices 10 are connected with the wire 11 which is carried to one terminal 12 of the automatic switch 13, having its opposite terminal 14 connected with the negative brush of the generator through lead 15. The negative side of the storage battery is connected with one side of the solenoid 16, the opposite side of which is connected as by the wire 17 with one side of the solenoid 18, the opposite side of which is connected with the wire 11 as indicated. The automatic switch is preferably one adapted to open and close a generator circuit when the voltage of the generator is very close to that of the battery and, as numerous automatic switches for this purpose are well known in the art, the presence of one of the well known variety is indicated diagrammatically merely. 19 is a core of magnetic material so disposed with regards the solenoid 16 that energization of the same tends to lift the said core. 20 and 21 are contact members carried by the core 19 and insulated therefrom as indicated. The adjustable spring 22 normally tends to draw the core 19 and members 20 and 21 downwardly and to cause electrical communication between the contact members 23 through the contact member 20 and between the contact members 24 through the member 21. The members 23 are in series with the solenoid 25 surrounding the core 7 and having in series therewith the adjustable resistance 26, the said solenoid 25 being connected across the generator mains through the contact members 23 and adjustable resistance 26. The contacts 24 when closed by members 21 short circuit the coil 18 as indicated. The main switch 13 may be so arranged if desired, that when open it closes the contacts 27 in such manner as to short circuit the coils 16 and 18 while the switch is open and the battery is supplying the entire current to the translating devices.

An operation of my invention is substantially as follows:—

If the generator be running and its voltage be below that of the battery, the automatic switch indicated diagrammatically at 13 in the drawing will be open and the lamps or translating devices may be fed by the battery 9, substantially all the current from the translating devices returning to the battery through the wire 29 shunting out coils 16 and 18. Under these conditions, current from the generator will flow through the coil 2 and resistance 3 and cause the generator to build up upon increases in speed in a well known manner and current will flow through the coil 25 as the contacts 23 will be connected by the member 20, and the current in the coil 25 will tend to draw the core 7 downwardly against the action of spring 5 and increase the resistance 3. If now the generator speed and consequent voltage be raised to that slightly in excess of the battery, the switch will close and current will flow from the generator to the translating devices 10 and return through main 11 and switch 13 to the generator, and if the voltage be sufficient, current will be supplied to the battery through coil 16, coil 18 being shunted out through contacts 24—21. If the speed of the generator be now increased until its voltage is the maximum desired to have impressed upon the storage battery or generator circuit, I so adjust the spring 5 and the resistance 26 that any appreciable increase in voltage above this limit will cause the core 7 to be drawn downwardly by coil 25 in such manner as to increase the resistance 3 and hold the desired maximum voltage from being exceeded. If this voltage which is not to be exceeded by the generator, produce a greater current than desired to the battery, which current will flow through the solenoid 16, I so adjust the spring 22 that any increase above the desired maximum output will cause the solenoid 16 to lift the core 19 and break the contacts at 23 and 24. The breaking of the contacts at 23 will render the coil 25 inoperative and the breaking of the contacts at 24 will open the shunt around the coil 18 and cause the generator current to the battery to pass through said coil in such manner that the generator is now current regulated instead of voltage regulated as before and the desired maximum charging current to the battery through the coil 18 will not be exceeded, regardless of how low a voltage may be necessary to cause this current. If now for any cause the current in the coil 16 shall fall to a minimum amount, which may be readily adjusted, the spring 22 will cause the contacts 23 and 24 to be reconnected and the generator will be voltage regulated as before.

From the foregoing, it will be obvious that I have produced a system wherein the generator is voltage regulated unless the desired voltage will cause too great a current to be delivered to the battery and then the generator regulator is automatically shifted to become a current regulator instead of a voltage regulator.

I do not wish in any way to limit myself to the exact details or mode of operation set forth in this specification for it will be obvious that wide departure may be made in the way of details without departing from the spirit and scope of my invention which is as set forth in the following claims:

1. The combination with a storage battery and a generator, of means for regulating the generator, operating means for controlling said regulating means responsive to voltage fluctuations, operating means for controlling said regulating means responsive to current fluctuations and means responsive to the current through the battery for rendering one of said operating means operative and the other inoperative.

2. The combination with a storage battery and a generator, of regulating means for the generator, voltage responsive operating means for said regulating means, current responsive operating means for the regulating means and means responsive to the current through the battery for determining which of the operating means shall be operative.

3. The combination with a storage battery and a generator, of means for regulating the generator, operating means for the regulating means responsive to voltage fluctuations, operating means for the regulating means responsive to current fluctuations and means whereby the current supplied by the generator to the battery determines which of said operating means shall regulate the generator.

4. The combination with a storage battery and a generator, of means for regulating the generator, operating means for the regulating means responsive to voltage fluctuations, operating means for the regulating means responsive to current fluctuations and means whereby the current supplied to the battery by the generator renders one of said operating means operative and the other inoperative.

5. The combination with a storage battery and a generator, of means for regulating the generator, operating means controlling the regulating means responsive to voltage fluctuations, operating means for controlling the regulating means responsive to current fluctuations, means whereby the operating means are rendered alternately operative and inoperative, and battery current controlled means for governing the last said means.

6. The combination with a storage battery, a generator and means for regulating the generator, of means for operating the regulating means responsive to voltage fluctuations, means for operating the regulating means in response to current fluctuations and battery current controlled means affecting both of said operating means.

7. The combination with a storage battery and a generator, of means for regulating the generator, controlling means therefor comprising a coil responsive to voltage fluctuations and a coil responsive to current fluctuations and automatic means responsive to current fluctuations through the battery for controlling the operation of said coils.

8. The combination with a storage battery and a generator, of means for controlling the generator, controlling means therefor comprising a coil responsive to voltage fluctuations and a coil responsive to current fluctuations and automatic means responsive to current fluctuations through the battery for rendering one of said coils operative and the other inoperative.

9. The combination with a storage battery and a generator, of means for regulating the generator, controlling means therefor comprising a coil responsive to voltage fluctuations and a coil responsive to battery current fluctuations and automatic means responsive to current fluctuations through the battery for determining which of said coils shall regulate the generator.

10. The combination with a storage battery, a generator and a circuit fed thereby, of means for regulating the generator, means for operating said regulating means responsive to voltage fluctuations across said circuit, means for operating the regulating means responsive to current fluctuations in the battery charging circuit and means for controlling both operating means responsive to current fluctuations in said circuit.

11. The combination with a storage battery and a generator, of a regulator for the generator comprising operating means comprehending a coil in shunt to said generator, a coil in series with said generator and battery and means for controlling the operativeness of said coils responsive to battery current fluctuations.

12. The combination with a generator having a field circuit and a battery circuit fed by said generator, of means for controlling the generator comprehending a regulating means in the field circuit, means for affecting said regulating means responsive to voltage fluctuations, means for affecting said regulating means responsive to current fluctuations and means for determining which of said affecting means shall be effective in the operation of the regulating means responsive to current fluctuations in said battery circuit supplied by the generator.

13. The combination with a storage battery and a generator; of means for regulating the generator; means for controlling said regulating means; and means actuated by the charging current for changing the mode of operation of the controlling means while the charging of the battery is in progress.

14. The combination of a storage battery and a generator; of means for regulating the generator; means for controlling said regulating means responsive to voltage fluctuations; means for controlling said regulating means responsive to current fluctuations; and means controlled by the current supplied to the battery for rendering the first-named controlling means inoperative, and the second-named controlling means operative, while the charging of the battery is in progress.

JOHN L. CREVELING.

Witnesses:
 ALFONSE L. SPIEGEL,
 ANNA M. WALL.